(12) United States Patent
Webb (10) Patent No.: US 7,296,601 B2
(45) Date of Patent: Nov. 20, 2007

(54) ABOVEGROUND FUELING STATION WITH VERTICAL TANKS

(75) Inventor: R. Michael Webb, Eau Claire, WI (US)

(73) Assignee: U-Fuel, Inc., Las Vegas, NV (US)

( * ) Notice: Subject to any disclaimer, the term of this patent is extended or adjusted under 35 U.S.C. 154(b) by 140 days.

(21) Appl. No.: 11/113,651

(22) Filed: Apr. 25, 2005

(65) Prior Publication Data

US 2006/0237092 A1    Oct. 26, 2006

(51) Int. Cl.
   *B65B 1/04*    (2006.01)
(52) U.S. Cl. ................... 141/98; 141/311 A; 141/86; 222/173; 222/108
(58) Field of Classification Search .............. 141/98, 141/94, 100, 9, 104, 311 A, 86; 222/173, 222/108, 608, 129; 137/234.6, 581, 376; 220/567.2
   See application file for complete search history.

(56) References Cited

U.S. PATENT DOCUMENTS

| 150,606 | A | 5/1874 | Perkins |
| 450,494 | A | 4/1891 | Proctor |
| 923,183 | A | 6/1909 | Johnson |
| 1,263,751 | A | 4/1918 | Elkins |
| 1,331,615 | A | 2/1920 | Brady |
| 1,562,991 | A | 11/1925 | Rudigier |
| 1,588,863 | A | 6/1926 | Walker |
| 1,604,257 | A | 10/1926 | Brooks |
| 1,908,684 | A | 5/1933 | Buchanan |
| 2,056,179 | A | 10/1936 | Fitch |
| 2,141,638 | A | 12/1938 | Bean |
| 2,189,945 | A | 2/1940 | Fitch |
| 2,259,319 | A | 10/1941 | Norbon |
| 2,285,830 | A | 6/1942 | Paget |
| 2,307,616 | A | 1/1943 | Booth |
| 2,327,475 | A | 8/1943 | Waugh |
| 4,901,748 | A | * 2/1990 | Shotmeyer ............... 137/234.6 |
| 5,184,116 | A | * 2/1993 | Daugherty et al. ......... 345/109 |

(Continued)

FOREIGN PATENT DOCUMENTS

CN        03154673.0        2/2007

(Continued)

OTHER PUBLICATIONS

Jane's Airport Equipment, Sep. 1986, 1986/1987.

*Primary Examiner*—Steven O. Douglas
(74) *Attorney, Agent, or Firm*—Knoble Yoshida & Dunleavy, LLC (57) ABSTRACT

An aboveground fueling facility includes one or more vertical fuel supply tanks, each of which is positioned on a reinforced mounting pad on a fueling island that also includes one or more fuel dispensers. Fuel is supplied from the vertical fuel supply tanks to the dispensers via piping that is secondarily contained within the reinforced mounting pad. Each of the vertical fuel supply tanks may have more than one compartment so as to permit different grades of fuel to be dispensed by the dispensers, including mixtures. Fueling lanes are defined between the vertical fuel supply tanks for permitting vehicular access to the fuel dispensers. A canopy for sheltering the fueling lanes is structurally supported by the vertical fuel supply tanks, and informational signage is provided on the canopy for providing information such as fuel pricing to the consumer.

30 Claims, 6 Drawing Sheets

U.S. PATENT DOCUMENTS

| | | | |
|---|---|---|---|
| 5,526,964 A * | 6/1996 | Moore et al. | 222/383.1 |
| 5,586,586 A * | 12/1996 | Fiech | 141/98 |
| 5,596,501 A * | 1/1997 | Comer et al. | 705/413 |
| 5,975,371 A * | 11/1999 | Webb | 222/173 |
| 6,109,290 A * | 8/2000 | Sabatinelli | 137/234.6 |
| 6,691,061 B1 * | 2/2004 | Rogers et al. | 702/156 |
| 7,096,895 B2 * | 8/2006 | Barker | 141/94 |

FOREIGN PATENT DOCUMENTS

| | | |
|---|---|---|
| FR | 850828 | 12/1939 |
| GB | 0944916 | 12/1963 |
| GB | 1007251 | 10/1965 |

\* cited by examiner

ABOVEGROUND FUELING STATION WITH VERTICAL TANKS

BACKGROUND OF THE INVENTION

1. Field of the Invention

This invention relates to an aboveground fueling or service station that can be conveniently and efficiently deployed in the desired location, and that is environmentally friendly, aesthetically attractive and particularly suited for installation in parking lots of supermarkets and shopping centers, as well as rural and underdeveloped areas.

2. Description of the Related Technology

Prior to 1987 and the passage of U.S. Environmental Protection Legislation, the majority of retail fuel stations stored product in underground tanks with pipes running to fuel islands that were under large canopies. Those few stations that used aboveground tanks typically ran underground pipe from a remote area at the edge of the station, where the tanks were contained in a dike, to a fuel island, as required by the national codes.

One significant disadvantage of in-ground refueling stations such as most existing vehicular service stations is the time and labor involved in preparing and constructing such a facility. Some factors that contribute to the expense of constructing a belowground facility include the need for construction permits, subcontractors, excavation, removing or boring through unanticipated underground obstructions, pumping out water due to high water table anchoring tanks so they do not float to the surface and the time and planning involved in locating a permanent site for the facility. Once installed, such facilities cannot practically be moved to different locations, or be sold.

With the realization that many underground fuel tanks and pipe were leaking and the subsequent passage of laws requiring expensive secondary containment of underground tanks and pipe, companies began designing aboveground tanks for fueling vehicles. Fueling facilities that use aboveground tanks have become more common in recent years, in no small part because of the efforts of the inventor, R. Michael Webb, and the company he founded, U-Fuel, Inc. of Eau Claire Wis. Aboveground fueling facilities that have been designed by Mr. Webb and marketed by U-Fuel, Inc. are disclosed in U.S. Pat. Nos. 4,988,020; 5,033,637; 5,305,926; and 5,562,162, the disclosures of which are hereby incorporated as if set forth fully herein.

Aboveground fueling facilities have a number of advantages, some of which are set forth above. However, traditional aboveground tanks are sometimes not aesthetically suitable for the purpose of service stations in developed areas, such as residential neighborhoods or in automotive service areas that are near busy highways. It is also necessary to lay large concrete pads to support the weight of the tank and to direct fluids such as rain water away from the tank so as to avoid contamination, especially in areas that have strict environmental regulations. Such pads must be constructed on site, because of their great size and weight. This prevents a contractor from prefabricating an entire aboveground service station and moving it on site, which would otherwise be economically desirable, especially when deploying a system in an underdeveloped or rural area that is remote from the facilities of the contractor.

Due to the required capacities of these systems, and the corresponding installation and the safety issues, most aboveground tanks used for fueling vehicles were oriented horizontally. Some of the disadvantages of using horizontal aboveground tanks are: the amount of horizontal space required for the tank and equipment; the obstructed view of the vehicles that circulate about the tank, the increased possibility of damage from impact by objects or traffic, and the potential of fire developing from transfer of fuel to and from the tank. Given these concerns, national and international codes prohibited the use of aboveground tanks for retail fuel sales and only permitted these systems for use at private fleet facilities.

However, with the increased interest and popularity of alternative fuels such as Ethanol E-85 and bio Diesel, there has developed a need for a small, inexpensive, environmentally safe, fuel station that can be quickly installed and operated as a vending machine, or be added to an existing retail station to provide additional fuels to the public without having to dig holes or do extensive construction. Until the new fuels increase in popularity, station owners are reluctant to risk the additional cost required to add these products.

Since there are very few locations in the United States that offer alternative fuels, demand is insufficient to justify increased supply. In order to increase demand, it is important that alternative fuel stations have a unique appearance so the motoring public can quickly recognize the availability of the fuel and feel confident enough to buy alternative fuel vehicles.

Even though the three major automobile companies have been producing cars that will burn the lower priced and environmentally safe E85 Ethanol since the year 2000, such as the Ford Taurus, the Ranger, the Chrysler Mini-Vans and the GM Suburban, much of the motoring public are not aware that they could be using alternative fuel and saving up to 20% of their cost. Those that are aware, find it difficult to locate stations that sell alternative fuels when they travel.

It is clear that a need exists for an improved aboveground service station facility that is convenient and inexpensive to deploy, space efficient, and that is aesthetically proper for use in developed areas such as residential neighborhoods or in automotive service areas by a busy highway.

SUMMARY OF THE INVENTION

Accordingly, it is an object of the invention to provide an improved aboveground service station facility that is convenient and inexpensive to deploy, space efficient, and that is aesthetically proper for use in developed areas such as residential neighborhoods or in automotive service areas by a busy highway.

In order to achieve the above and other objects of the invention, an aboveground fueling facility according to a first aspect of the invention includes an elongated fueling island, the elongated fueling island defining a boundary of a first fueling lane on a first side thereof and a boundary of a second fueling lane on a second side thereof; a vertical fuel storage tank positioned on the fueling island; and a fuel dispensing system for dispensing fuel from the vertical fuel storage tank into a vehicle, the fuel dispensing system being accessible from both the first fueling lane and from the second fueling lane.

According to a second aspect of the invention, an aboveground fueling facility includes a fueling island; a vertical fuel storage tank positioned on the island with one or more fuel dispensers attached to the tank; and a canopy attached to the top of the vertical fuel tank extending over the dispensers.

According to a third aspect of the invention, an aboveground fueling facility includes a plurality of aboveground vertical fuel storage tanks; a fuel dispensing system for dispensing fuel from the vertical fuel storage tanks; at least one fueling lane defined between two of the vertical fuel storage tanks; and a canopy that is structurally supported by at least two of the vertical fuel storage tanks, the canopy being constructed and arranged to shelter the fueling lane.

These and various other advantages and features of novelty that characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

Figure 1:
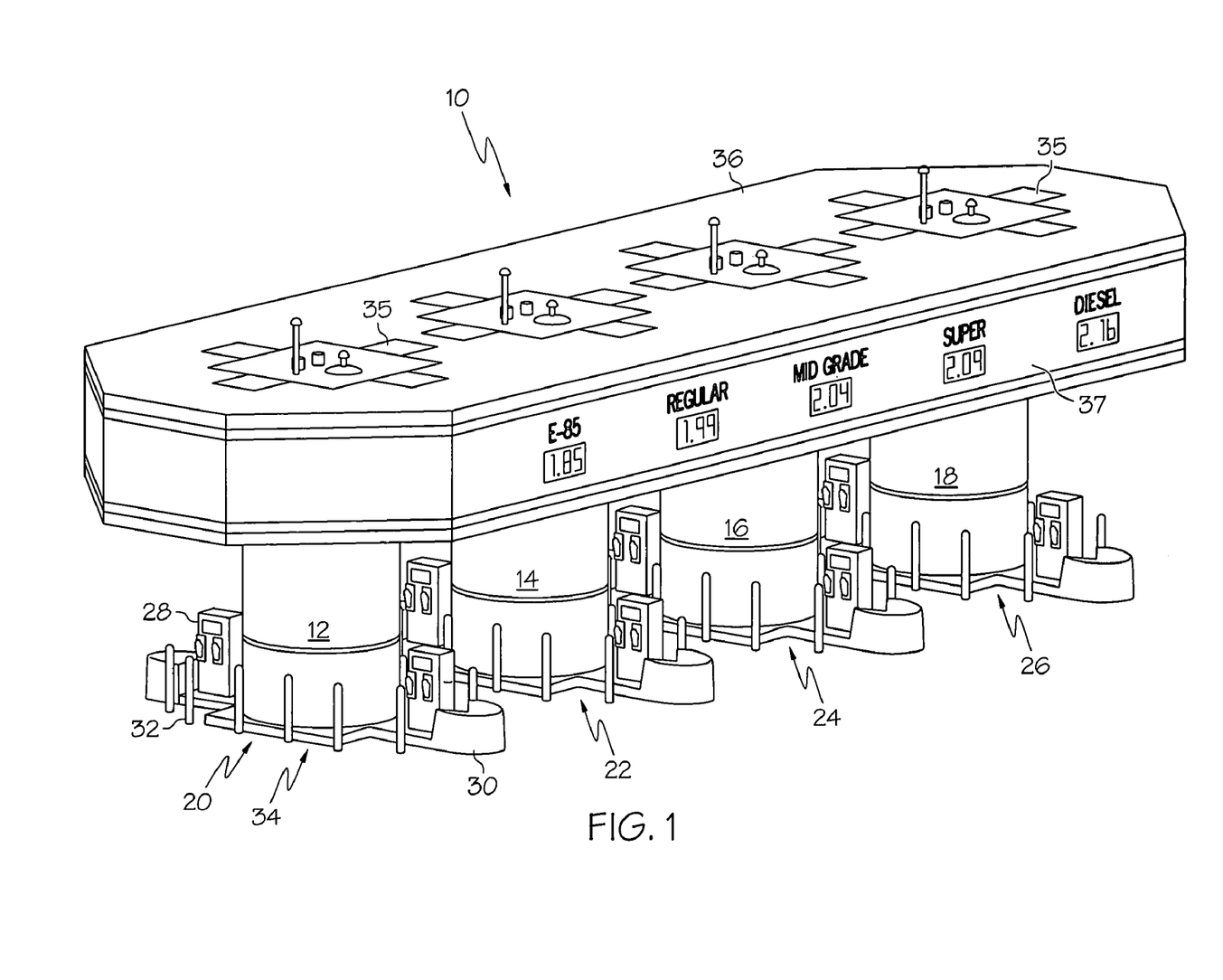
FIG. 1 is a perspective view of an aboveground vertical tank fueling facility that is constructed according to a preferred embodiment of the invention.

Referring now to the drawings, wherein like reference numerals designate corresponding structure throughout the views, and referring in particular to FIG. 1, an aboveground vertical tank fueling facility 10 that is constructed according to the preferred embodiment of the invention includes a plurality of vertical fuel storage tanks 12, 14, 16, 18 which in the preferred embodiment number four. Alternatively, according to the invention, there could be more or fewer vertical fuel storage tanks than that depicted with respect to the preferred embodiment, including an embodiment that would have just one vertical fuel storage tank. As FIG. 1 shows, each of the vertical fuel storage tanks 12, 14, 16, 18 is respectively positioned on an elongated fueling island 20, 22, 24, 26, each of which is further provided with a fueling system that preferably includes a plurality of vehicular fueling dispensers 28.

In the preferred embodiment, each of the fueling islands is elongated in shape, having first and second ends at which concrete barriers 30 are deployed and first and second sides that define vehicular fueling lanes through which vehicles may drive in order to receive fuel that is dispensed from one of the vehicular fueling dispensers 28. In order to provide protection for the storage tanks 12, 14, 16, 18 and the vehicular fueling dispensers 28, a plurality of vertically extending metal ballards 32 are positioned about the periphery of each of the fueling islands 20, 22, 24, 26. Each of the vertical fuel storage tanks 12,14, 16, 18 further preferably includes a reinforced aboveground pad 34 for structurally supporting the aboveground vertical storage tank and the fueling dispensers, an enclosure protecting electrical and signal connections providing structure for anchoring tanks to concrete pads and for providing secondary containment for the piping therebetween.

According to one important aspect of the invention, the aboveground vertical fuel storage tanks 12, 14, 16, 18 in addition to holding fuel that will be dispensed by the dispensers 28 provide a structural support for a canopy 36 that is sized and configured to provide shelter from rain, snow and sunlight to vehicles that are positioned for fueling at the aboveground fueling facility 10. In other words, canopy 36 is configured to completely cover each of the fueling island's 20, 22, 24, 26 and the fueling lanes that are defined therebetween. In addition, given the large size of the canopy, signage 37 is preferably provided on the canopy 36 for providing information to consumers such as the types of fuels that are available at the aboveground fueling facility 10 and the prices for each grade of fuel. Preferably, signage 37 includes a plurality of electronic signs that may be electronically adjusted remotely by an operator. The provision of signage 37 on the canopy 36 eliminates the need for separate signage to be erected at the site of the aboveground fueling facility 10 and facilitates the quick, efficient deployment of the fueling facility 10 at a desired location.

As a means of protecting against damage to the large canopy 36 from strong winds creating an uplifting force, air vents 35 are located in the roof of canopy 36 adjacent to storage tanks 12, 14, 16, 18 to relieve air pressure and provide access for maintenance.

Figure 2:
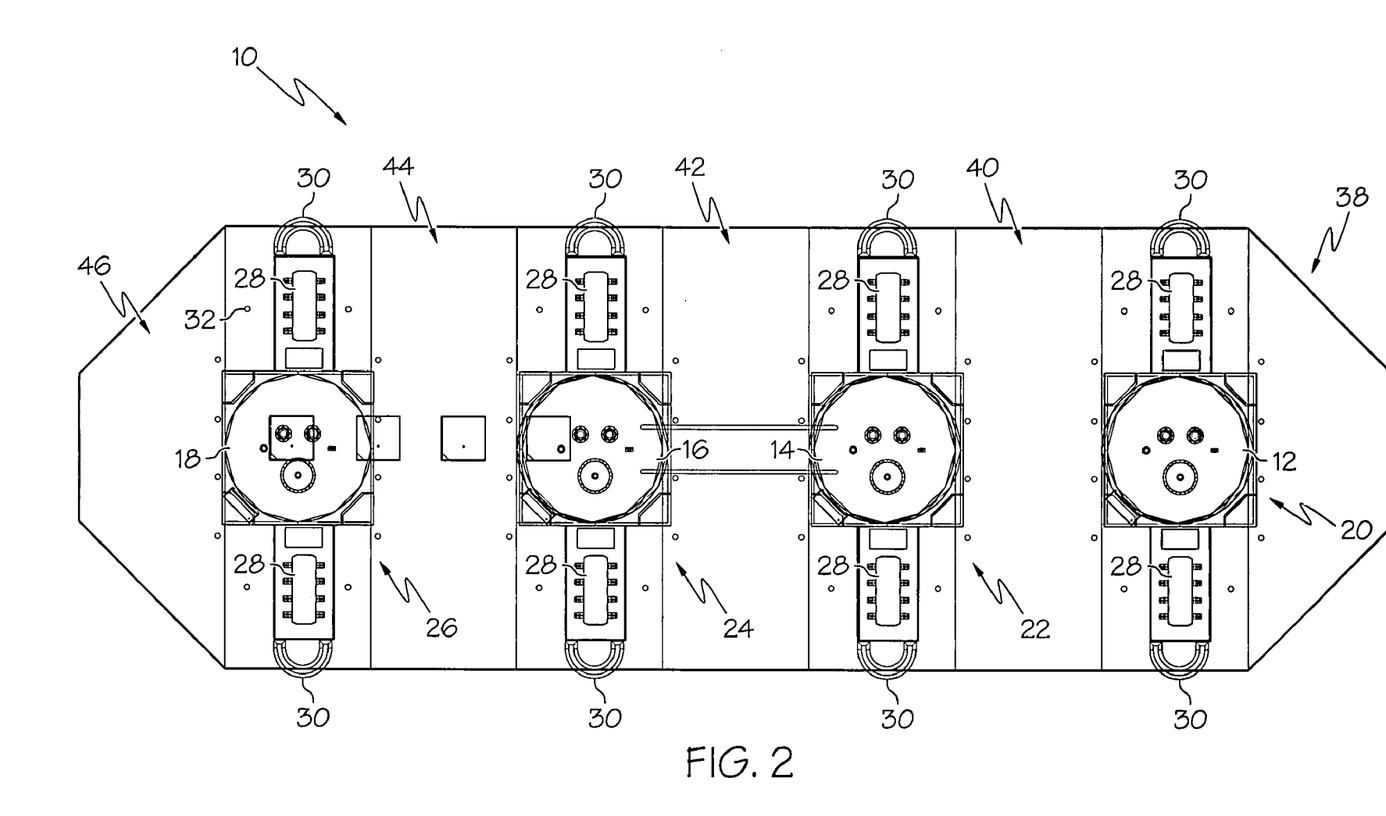
FIG. 2 is a diagrammatical view depicting the facility that is shown in FIG. 1.

Referring now to FIG. 2, it will be seen that a plurality of fueling lanes 38, 40, 42, 44, 46 are defined by the sides of the elongated fueling islands 20, 22, 24, 26. In the illustrated embodiment, a first fueling lane 38 is defined by a first side of the first elongated fueling island 20, a second fueling lane 40 is defined between the second side of the first elongated fueling island 20 and a first side of the second elongated fueling island 22, a third fueling lane 42 is defined by a second side of the second elongated fueling island 22 and a first side of the third elongated fueling island 24, a fourth fueling lane 44 is defined by a second side of the third elongated fueling island 24 and a first side of the fourth elongated fueling lane 26 a fifth fueling lane 46 is defined on a second side of the fourth elongated fueling lane 26. Preferably, each of the vehicular fueling dispensers 28 are constructed so that they can dispense fuel to a vehicle that is positioned in either adjacent fueling lane. In the illustrated embodiment, the fueling lanes are sized to permit one-way traffic therethrough, with each fueling lane permitting access to two fuel dispensing dispensers 28 on each side of the vehicle. Accordingly, each fueling lane may simultaneously service two vehicles, one in a forward position and one in a rearward position within the fueling lane. Alternatively, the fueling lanes may be configured so as to permit two-way vehicular traffic, in which case they would be roughly twice the width that they are in the preferred embodiment. In the preferred embodiment, each of the fueling lanes defined between adjacent fueling islands is preferably between about 6 feet to about 10 feet in width, as measured from the outermost extent of the ballards that are positioned at the side of the fueling islands. An embodiment that permitted two-way traffic, each of the fueling lanes defined between adjacent fueling islands would preferably be about 10 feet to about 20 feet in width.

One important advantage that is created by the present invention is the relatively small horizontal dimension of a vertical fuel storage tank permits space efficient deployment of the vertical storage tank within the fueling island itself, as opposed to a remote location, and further permits fuel to be dispensed from both sides of the fueling island. The dimensions of the vertical storage tanks 12, 14, 16, 18 are critical in permitting the vehicular fuel dispensing dispensers to be able to dispense fuel to vehicles in either of the fueling lanes that are defined by the sides of the elongated fueling islands. Preferably, each of the vertical storage tanks 12, 14, 16, 18 is constructed so as to have an outer diameter that is within a range of about 7 feet to about 15 feet, and more preferably that is within a range of about 8 feet to about 12 feet, which as may be seen in the drawings represents the maximum horizontal dimension of the vertical storage tank. Most preferably, the vertical fuel storage tanks 12, 14, 16, 18 have an outer diameter that is within a range of about 9 feet to about 11 feet. Moreover, each of the vertical fuel storage tanks 12, 14, 16, 18 preferably has a height or maximum vertical dimension that is within a range of about 8 feet to about 35 feet, and more preferably within a range of about 15 feet to about 24 feet. This height is important in determining the location of the attached canopy 36 and a volumetric capacity of the fuel storage tanks 12, 14, 16, 18.

Figure 4:
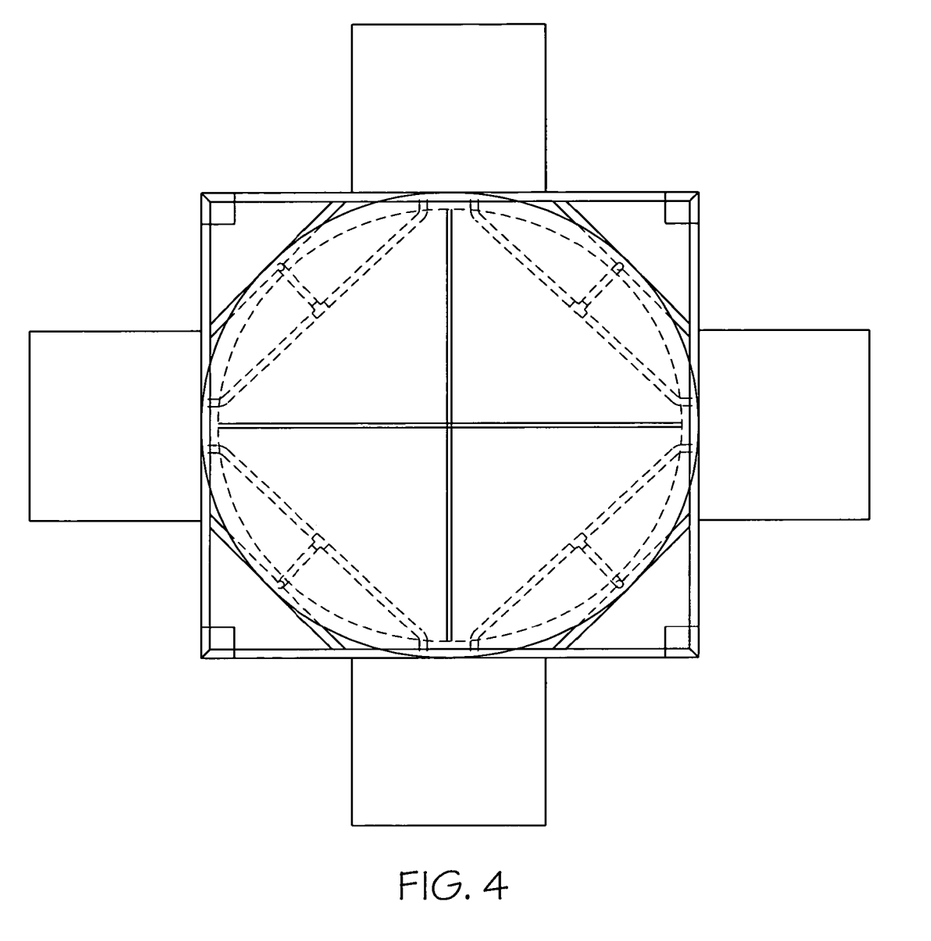
FIG. 4 is a top plan view of a vertical fuel tank that is used in an alternative embodiment of the invention.

In the preferred embodiment, and as is best shown in FIG. 4, each of the vertical fuel storage tanks 12, 14, 16, 18 preferably includes a generally cylindrical inner tank 48 and a concentrically disposed generally cylindrical outer tank 50. An interstitial space 49 is defined between the inner and outer tanks 48, 50. Preferably, structural reinforcement is provided in the interstitial space 49, which in the preferred embodiment comprises a plurality of angle iron elements 52 that extend vertically within the interstitial space 49. Alternatively, structural reinforcement could be achieved by packing the interstitial space 49 with a material such as concrete.

Figure 3:
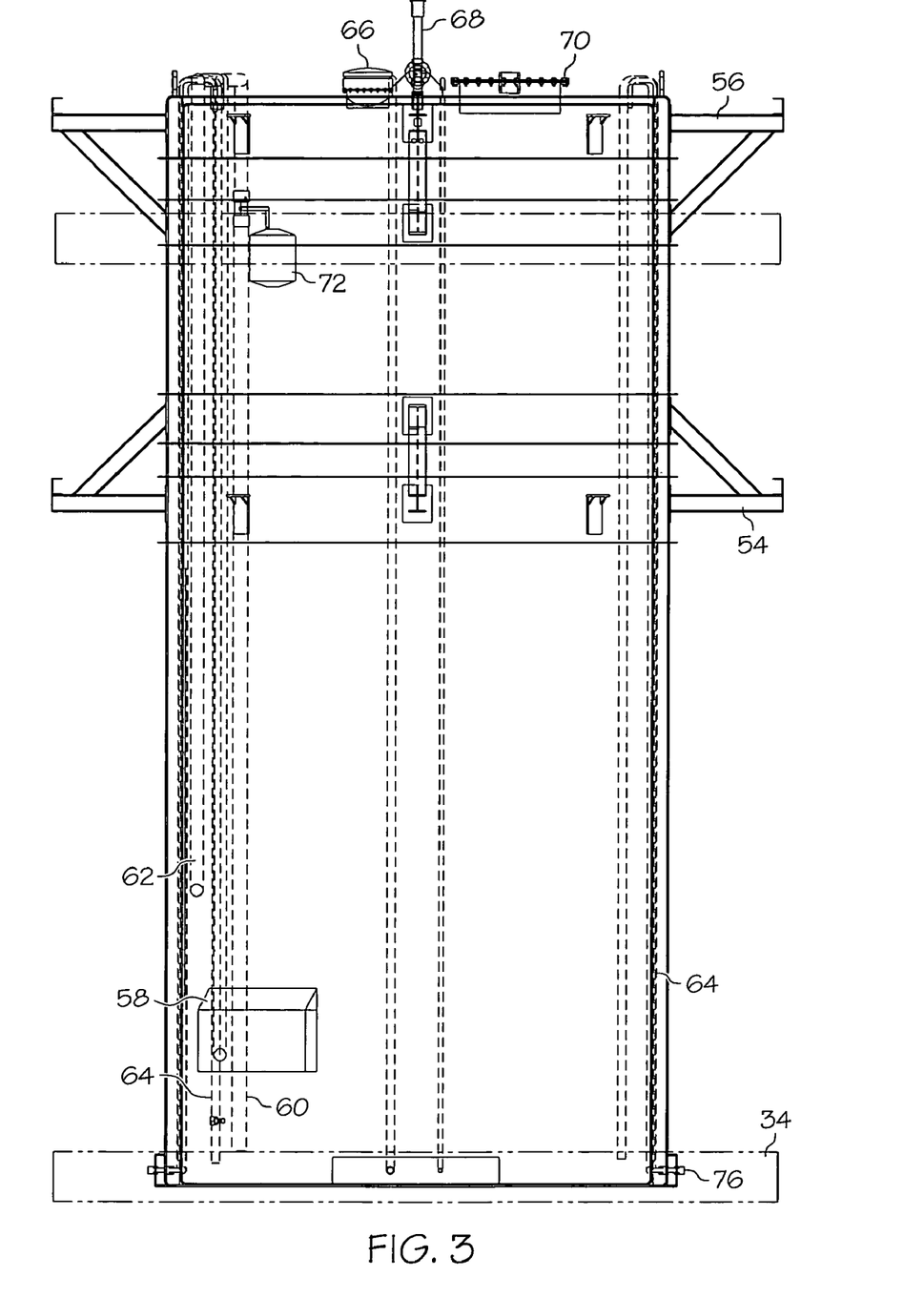
FIG. 3 is a diagrammatical elevational view of a vertical fuel tank that is used in the facility shown in FIG. 1.

FIG. 3 depicts a vertical fuel storage tank that has only a single compartment defined therein. FIG. 4 depicts a vertical storage tank having more than one compartment defined therein, so that multiple grades of fuel may be dispensed therefrom. In an aboveground fueling facility 10 such as that shown in the preferred embodiment that has multiple storage tanks 12, 14, 16, 18, different grades of fuel may be dispensed to vehicles by piping the fuel from a remote storage tank, i.e. a vehicle in second fueling lane 40 could be supplied with premium fuel that is supplied by the third vertical fuel storage tank 16, or the vehicle could receive a blended midgrade fuel supplied by third fuel storage tank 16 and second fuel tank 14. In this case, the piping between the different fueling islands would be secondarily contained above the canopy 36 extending overhead. Preferably, however, different grades of fuel are dispensed from the storage tank that is disposed immediately adjacent to the fueling lane.

As FIG. 3 shows, the canopy 36 is structurally supported by the outer tank 50 by means of a plurality of lower canopy support brackets 54 and a plurality of upper canopy support brackets 56 that are welded to the outside of the outer tank 50 opposite internal braces 52. A secure fill box 58 is positioned at a lower portion of the fuel storage tank and is preferably locked to permit secure access by authorize refilling personnel, such as a tanker truck. A fill connection is provided therein that permits fuel to be pumped into the vertical fuel storage tank through a fill pipe 60 that extends upwardly through the interstitial space 49 and downwardly into the inner tank 48, terminating near the bottom of the inner tank 48. A stage I vapor recovery system 62 is further provided for ensuring that vapor that is displaced from the vertical fuel storage tank during refilling is recovered by the fuel service vehicle. Suction lines 64 are preferably provided within the inner tank 48, extending upwardly and then downwardly within the interstitial space 49, leading to the vehicular refueling dispensers 28 through a secondarily contained pipe 76 that is provided within the reinforced pad 34 at the fueling island. Each compartment of the vertical fuel storage tank is provided with a conventional emergency vent 66, a conventional working vent 68 and an access manway 70 that is configured to permit service personnel to access the inside of the vertical fuel storage tank. An internal ignition suppression system 72 is preferably provided within each of the fuel storage compartments defined within the vertical fuel storage tank. Advantageously, the working vent 68, the emergency vent 66 and the access manway 70 extend through the canopy roof 36, best-shown in FIG. 1, so that venting can be achieved without interference by the canopy 36 and without jeopardizing consumers to unnecessary fumes and hazards, and so that service personnel can access the interior of the vertical fuel storage tanks without interference by the canopy 36.

Figure 5:
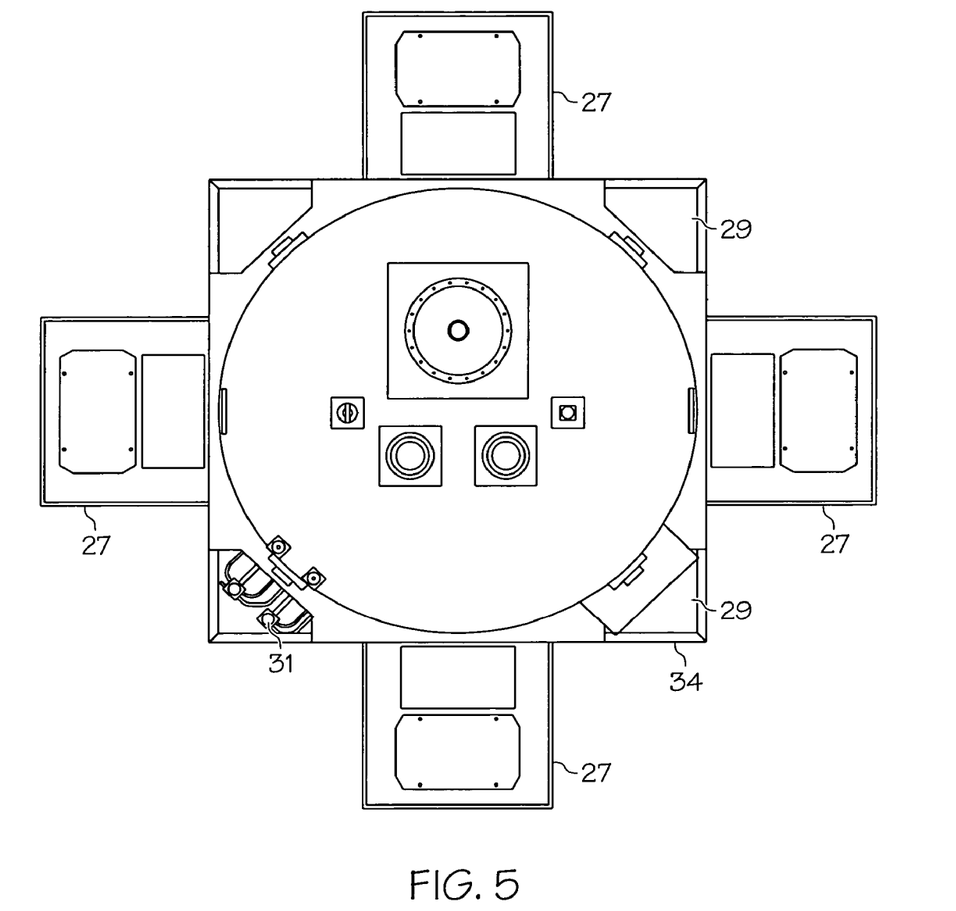
FIG. 5 depicts a top view of the exterior of a single product vertical fuel storage tank.

FIG. 5 depicts a top view of the exterior of a single product vertical fuel storage tank with four short dispensing islands 27 designed for perpendicular fueling lanes. This embodiment of the vertical fueling facility allows fueling of the large number of vehicles in the smallest space of approximately 900 ft.$^2$, including the station. Removable covers 29 provide access to secure vertical fuel station to a mounting pad 34 and electronic junction boxes 31.

Figure 6:
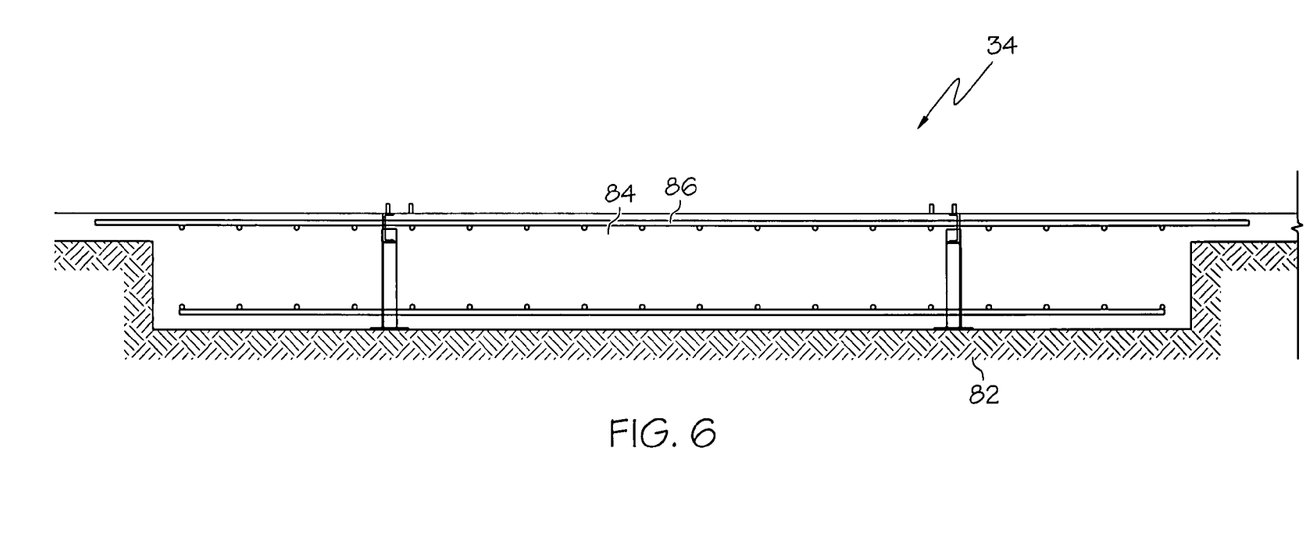
FIG. 6 is a fragmentary cross-sectional view depicting a reinforced mounting pad that is used in a facility according to the preferred embodiment of the invention.

FIG. 6 depicts a cross-sectional view of a reinforced mounting pad 34 that is provided at each of the fueling islands 20, 22, 24, 26 for supporting the vertical fuel storage tank 12, 14, 16, 18 and the associated vehicular refueling dispensers 28 and anchoring the station to prevent uplifting due to high winds. As shown in FIG. 5, mounting pad 34 extends into a recess that is defined into the ground 82 and includes concrete 84 that is reinforced with structural metallic rebar material 86.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. An aboveground fueling facility, comprising:
   an elongated fueling island;
   a first elongated fueling lane on a first side of said elongated fueling island, said elongated fueling island defining a boundary of said first elongated fueling lane;
   a second elongated fueling lane on a second side of said elongated fueling island, said elongated fueling island defining a boundary of said second elongated fueling lane;
   a vertical fuel storage tank positioned on said fueling island, said vertical storage tank having a maximum vertical dimension and a maximum horizontal dimension, with said maximum vertical dimension being greater than said maximum horizontal dimension; and
   fuel dispensing means for dispensing fuel from said vertical fuel storage tank into a vehicle, said fuel dispensing means being accessible from both said first elongated fueling lane and from said second elongated fueling lane.

2. An aboveground fueling facility according to claim 1, wherein said vertical fuel storage tank has a maximum horizontal dimension that is within a range of about 7 feet to about 15 feet.

3. An aboveground fueling facility according to claim 2, wherein said vertical fuel storage tank has a maximum horizontal dimension that is within a range of about 8 feet to about 12 feet.

4. An aboveground fueling facility according to claim 3, wherein said vertical fuel storage tank has a maximum horizontal dimension that is within a range of about 9 feet to about 11 feet.

5. An aboveground fueling facility according to claim 1, wherein said vertical fuel storage tank has a maximum vertical dimension that is within a range of about 8 feet to about 35 feet.

6. An aboveground fueling facility according to claim 5, wherein said vertical fuel storage tank has a maximum vertical dimension that is within a range of about 15 feet to about 24 feet.

7. An aboveground fueling facility according to claim 1, wherein said fuel dispensing means comprises at least a first fuel dispenser that is located proximate to a first end of said elongated fueling island, a second fuel dispenser that is located proximate to a second, opposite end of said elongated fueling island, and wherein said vertical fuel storage tank is positioned between said first and second fuel dispensers.

8. An aboveground fueling facility according to claim 7, wherein each of said first and second fuel dispensers is constructed and arranged to be accessible from both said first elongated fueling lane and from said second elongated fueling lane.

9. An aboveground fueling facility according to claim 1, wherein said vertical fuel storage tank comprises a first compartment defined therein containing a first type of fuel and a second compartment defined therein containing a second type of fuel, and wherein said fuel dispensing means is constructed and arranged to selectively dispense fuel from either said first or second compartment.

10. An aboveground fueling facility according to claim 9, wherein said fuel dispensing means is further constructed and arranged to dispense a mixture of said first type of fuel and said second type of fuel.

11. An aboveground fueling facility, comprising:
an elongated fueling island having a first end and a second, opposite end;
a vertical fuel storage tank positioned on said elongated fueling island, said vertical storage tank having a maximum vertical dimension and a maximum horizontal dimension, with said maximum vertical dimension being greater than said maximum horizontal dimension;
a first fuel dispenser that is located proximate to said first end of said elongated fueling island;
a second fuel dispenser that is located proximate to said second end of said elongated fueling island, and wherein said vertical fuel storage tank is positioned between said first and second fuel dispensers; and
a canopy attached to said vertical fuel tank, said canopy extending over both said first fuel dispenser and said second fuel dispenser.

12. An aboveground fueling facility according to claim 11, wherein said vertical fuel storage tank has a maximum horizontal dimension that is within the range of about 7 feet to about 15 feet.

13. An aboveground fueling facility according to claim 11, wherein said vertical fuel storage tank has a maximum horizontal dimension that is within a range of about 8 feet to about 35 feet.

14. An aboveground fueling facility according to claim 11, wherein said vertical tank has a plurality of internal compartments, permitting storage of more than one fuel product.

15. An aboveground fueling facility according to claim 11, wherein said attached canopy contains openings therein to vent excess air pressure.

16. An aboveground fueling facility according to claim 11, wherein said vertical tank comprises an inner wall and an outer wall, with interstitial space defined between said inner wall and said outer wall, and wherein at least one conduit is provided in said interstitial space for transporting fuel.

17. An aboveground fueling facility according to claim 16, further comprising at least one electrical conduit extending within said interstitial space.

18. An aboveground fueling facility according to claim 16, further comprising reinforcing means provided within said interstitial space.

19. An aboveground fueling facility according to claim 11, wherein said canopy comprises at least one portion thereof that is translucent.

20. An aboveground fueling facility according to claim 19, further comprising means for projecting an image on said translucent portion of said canopy.

21. An aboveground fueling facility according to claim 11, further comprising fire suppression means mounted on said canopy.

22. An aboveground fueling facility, comprising:
a plurality of aboveground vertical fuel storage tanks, each of said vertical storage tanks having a maximum vertical dimension and a maximum horizontal dimension, with said maximum vertical dimension being greater than said maximum horizontal dimension;
fuel dispensing means for dispensing fuel from said vertical fuel storage tanks;
at least one elongated fueling lane defined between two of said vertical fuel storage tanks; and
a canopy that is structurally supported by at least two of said vertical fuel storage tanks, said canopy being constructed and arranged to shelter said fueling lane.

23. An aboveground fueling facility according to claim 22, wherein said aboveground vertical fuel storage tanks each include an inner wall, an outer wall and an interstitial space defined between said inner and outer walls, and further comprising reinforcing means positioned within said interstitial space.

24. An aboveground fueling facility according to claim 23, wherein said canopy is structurally supported by said outer walls of said aboveground vertical fuel storage tanks.

25. An aboveground fueling facility according to claim 22, wherein said vertical fuel storage tanks each have a maximum horizontal dimension that is within a range of about 7 feet to about 15 feet.

26. An aboveground fueling facility according to claim 25, wherein said vertical fuel storage tanks each have a maximum horizontal dimension that is within a range of about 8 feet to about 12 feet.

27. An aboveground fueling facility according to claim 22, wherein said vertical fuel storage tanks each have a maximum vertical dimension that is within a range of about 8 feet to about 35 feet.

28. An aboveground fueling facility according to claim 27, wherein said vertical fuel storage tanks each have a maximum vertical dimension that is within a range of about 15 feet to about 24 feet.

29. An aboveground fueling facility according to claim 22, further comprising informational signage means positioned on said canopy for providing information to a consumer.

30. An aboveground fueling facility according to claim 29, wherein said informational signage means comprises an electronic sign for indicating pricing information to a consumer.

* * * * *